United States Patent [19]
Derickson

[11] 4,355,940
[45] Oct. 26, 1982

[54] AUTOMATIC LOADING PLATFORM AND METHOD OF USING SAME

[76] Inventor: Edward E. Derickson, Mtd Rte., Alberta Dr., Aurora, Ind. 47025

[21] Appl. No.: 151,872

[22] Filed: May 21, 1980

[51] Int. Cl.³ .................................................. B65G 67/04
[52] U.S. Cl. .................................... 414/439; 414/345; 414/573; 414/676; 414/786
[58] Field of Search ............... 414/345, 434, 439, 440, 414/529, 676, 573, 786

[56] References Cited

U.S. PATENT DOCUMENTS

| | | | |
|---|---|---|---|
| 2,468,055 | 4/1949 | Gibler | 414/439 |
| 3,727,777 | 4/1973 | Hanson | 414/400 |
| 3,836,021 | 9/1974 | McWilliams | 414/398 |
| 4,103,789 | 8/1978 | Hanson | 414/398 |

Primary Examiner—Richard A. Bertsch
Attorney, Agent, or Firm—Sandler & Greenblum

[57] ABSTRACT

An automatic loading platform for facilitating the loading and unloading of palletized loads is provided. The platform comprises an upper surface and an inclined ramp. A plurality of rotatable drive rollers extend above the upper surface to support a load, and the upper surface includes a plurality of air exit ports to provide a fluid bearing surface for the load. The drive rollers rotate in response to the rotation of carrier rollers and wheels, such response occuring only after air is supplied to the frame, and after the carrier rollers rotate in response to translational movement of the platform. A method for unloading a load from the platform by creating relative motion between the platform and load is thereby provided.

19 Claims, 8 Drawing Figures

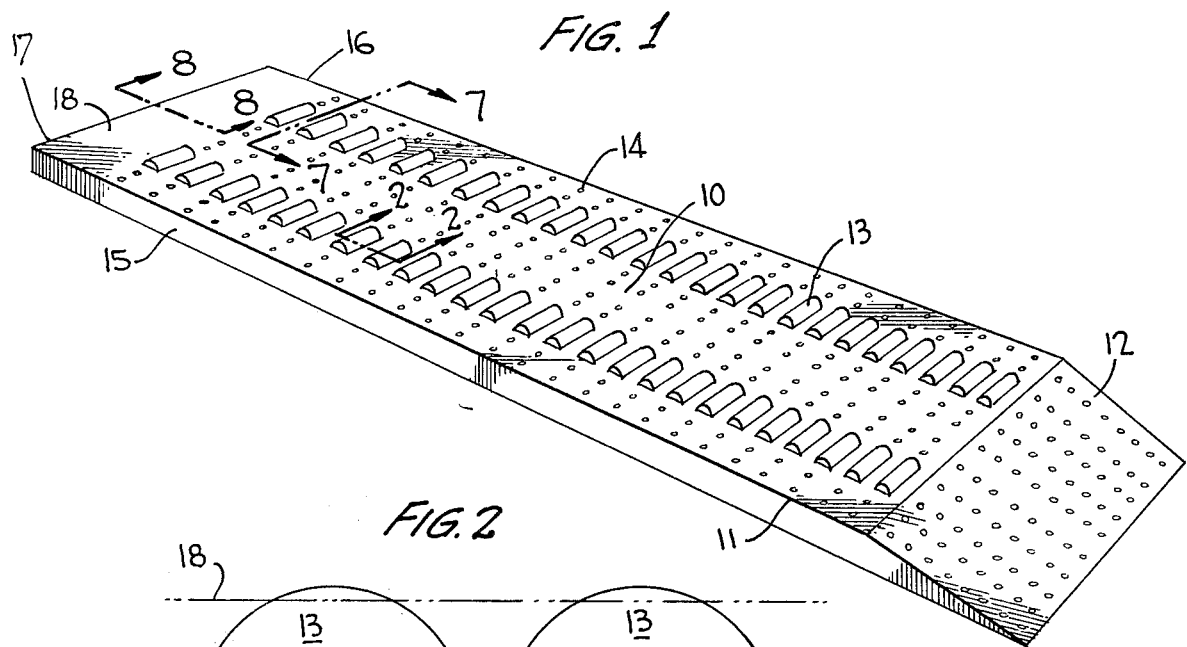
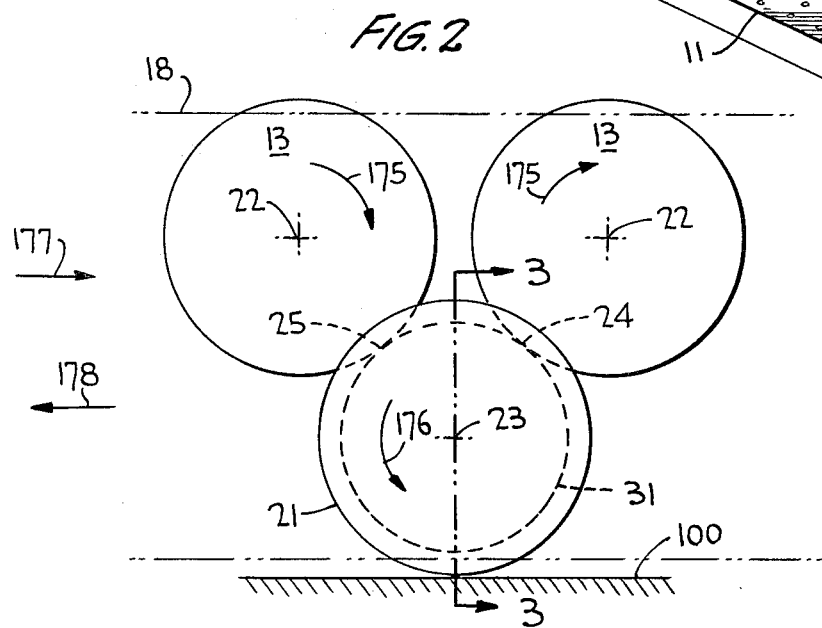
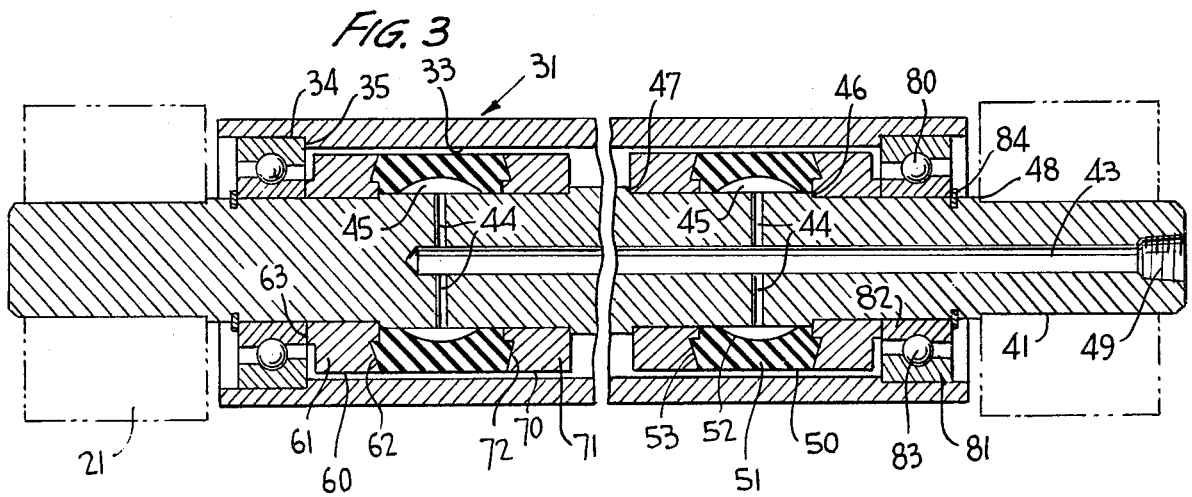

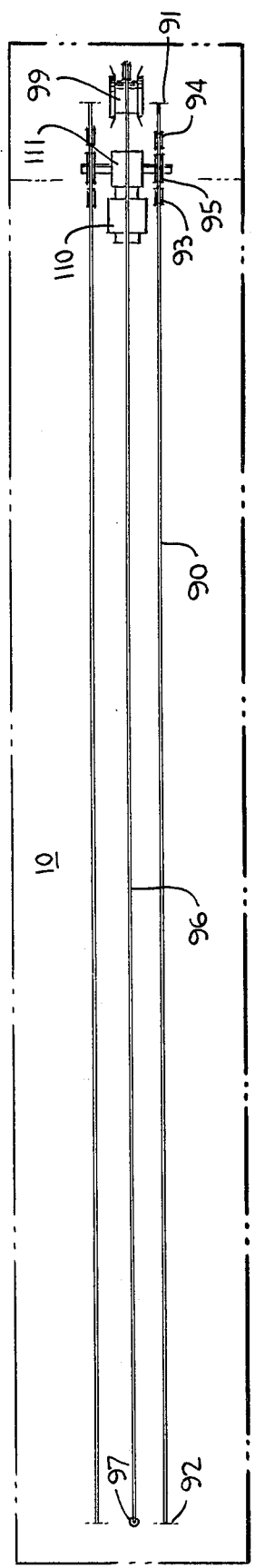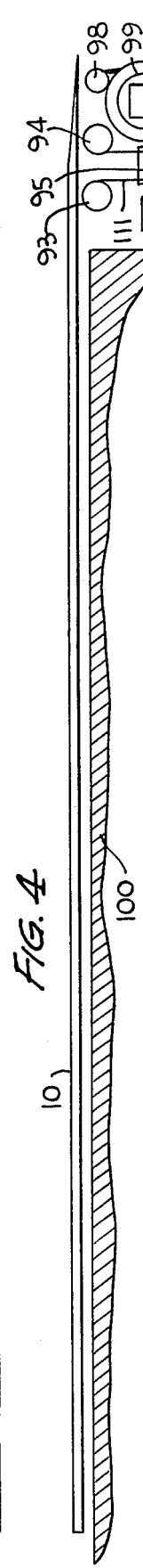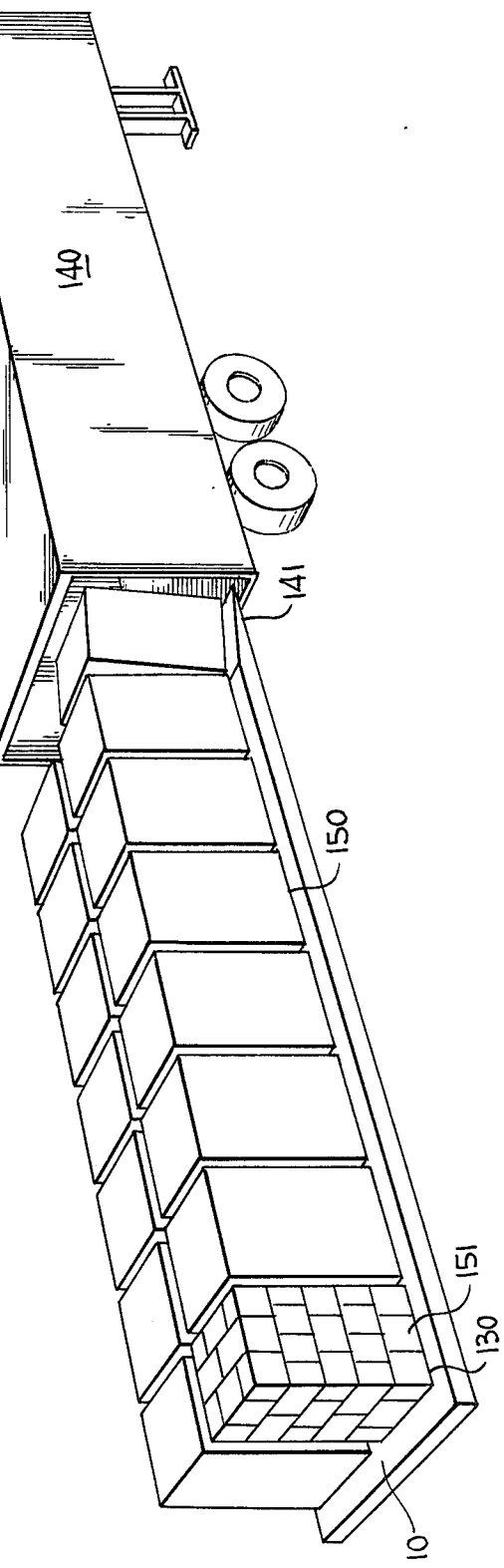

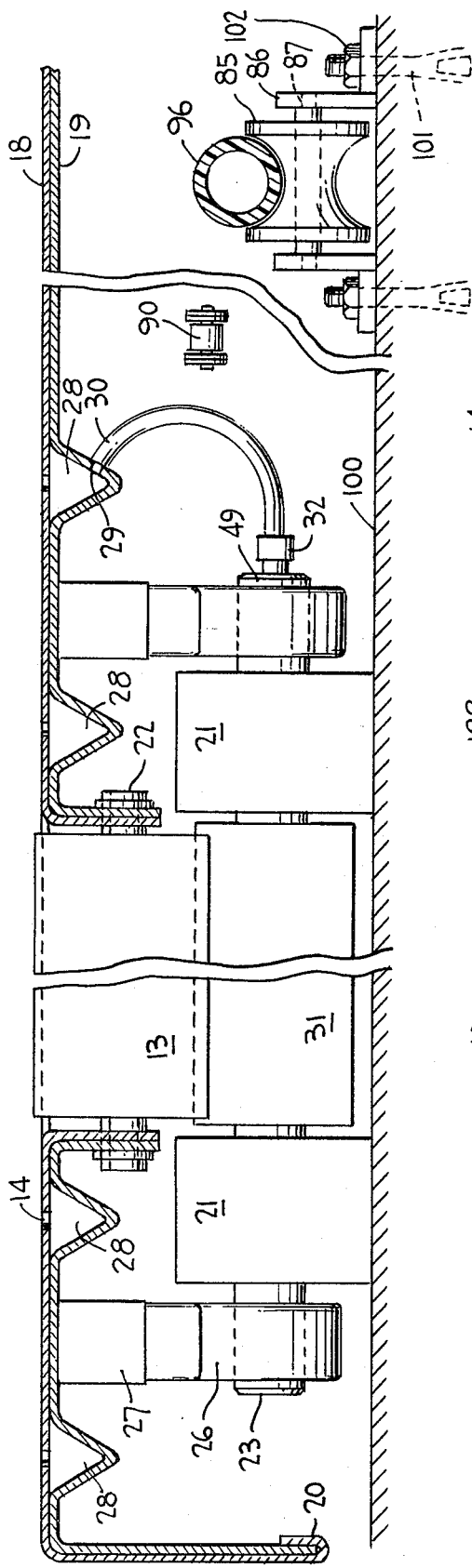
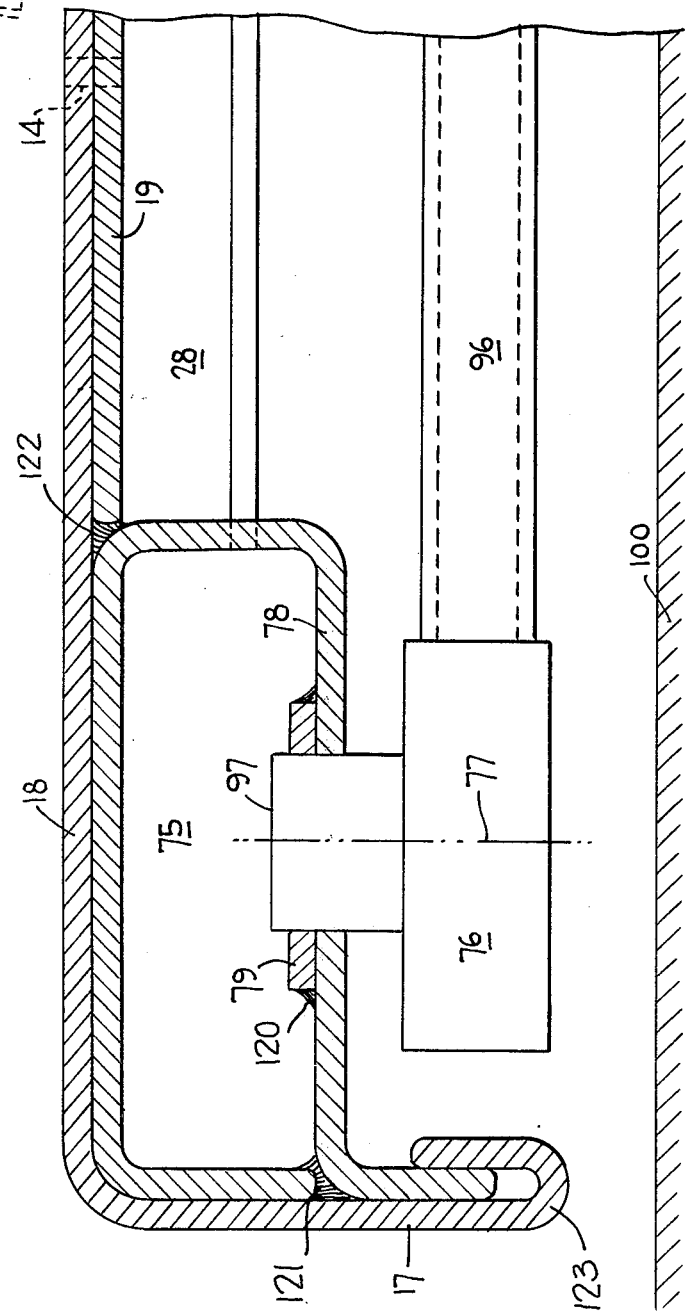

AUTOMATIC LOADING PLATFORM AND METHOD OF USING SAME

BACKGROUND OF THE INVENTION

1. Field of the Invention

The present invention generally relates to an automatic loading platform and more specifically to an automatic loading platform for palletized loads which facilitates vehicle loading and unloading, together with a method of using the platform.

2. Discussion of Prior Art

Loading of trucks, railroad cars and other large vehicles has generally been a time consuming proposition which requires a plurality of trips by a forklift truck for arranging cargo within the larger vehicle. These loading operations require the positioning of a number of smaller palletized loads in as compact an arrangement as possible within the vehicle. It is inconvenient and awkward to individually place a plurality of these loads in the vehicles, and such a process requires an inordinately long period of time to complete.

ANDREWS et al, U.S. Pat. No. 4,103,789, discloses a unitary loader comprising a frame having a plurality of air bearings on both its upper surface and its lower surface. The bearings on the upper surface support cargo placed on the loader and the bearings on the lower surface support the frame on the floor of the vehicle on which it is placed. The bearings comprise a backing plate and a rubber face and are inflatable to facilitate the movement of materials thereon. A pusher is provided on the framework to load small amounts of cargo individually onto the platform. A motor is provided for driving a chain which extends the loader into the vehicle; once the load is completely within the vehicle, the top surface air bearings are inflated to ease the movement of cargo from the loading platform. Simultaneously, the loader is retracted from the floor of the vehicle and the cargo is thereby deposited on the floor of the vehicle.

HANSON, U.S. Pat. No. 3,727,777, discloses an automatically operated vehicle loader which includes a slide inserted into a vehicle for loading and which is automatically moved out of the vehicle once loading begins. A wheeled main loading platform is provided which includes drive wheels mounted on shafts which protrude above the top of the table on which the slide is retained. The shafts and wheels are driven together by chain arrangements and a reversible drive motor. A loading slide is placed on top of the table or platform and includes a plurality of rows of rollers on the sides of the slide so that pallet skids can ride upon the rollers as they are loaded from a conveyor. A pusher device is mounted on the slide member for longitudinal movement and for transporting cargo to the rear portion of the truck or vehicle.

McWILLIAMS, U.S. Pat. No. 3,836,021, discloses a mailbag truck loading apparatus comprising a chute and a storage conveyor. A mailbag loading conveyor or loading head is also provided. A conveyor belt and conveyor are provided for propelling or flinging the mailbags forwardly into load position on the floor of a large truck or other vehicle. A sensing apparatus is provided for tilting a mailbag receiving conveyor to achieve compact loading of the bags. The frame, which comprises the mailbag loading conveyor, can be formed of rollers, slider plates or similar devices over which the conveyor belt may be placed.

None of these apparatus provide for an automatic pallet loading apparatus which provides a simple means for loading and unloading of a unitary platform onto a large truck or similar vehicle. Nor do any of these devices provide for rollers which automatically unload cargo in response to translational movement of a platform being withdrawn. Further, none of these devices provide for movement of drive rollers in response to carrier roller motion, nor the movement of carrier rollers in response to platform motion.

SUMMARY OF THE INVENTION

Accordingly, it is a general object of the present invention to provide a new and improved automatic loading platform which will facilitate the loading of a plurality of pallet or other loads onto large trucks and similar vehicles.

It is an additional object of the present invention to provide a new and improved automatic loading platform which provides for prestaging of pallet loads onto a unitary platform and subsequent automatic loading of the platform onto various types of vehicles.

It is a further object of the present invention to provide a new and improved automatic loading platform in which pallet loads can be loaded onto a surface of the platform which includes a plurality of rollers from which the loads can be automatically unloaded in response to translational movement of the platform.

Additional objects, advantages and features of the present invention will become more fully apparent to those skilled in the art to which this invention pertains in view of the following specification, drawings and appended claims.

Briefly, the above and other objects, features and advantages of the present invention are attained in one aspect thereof by providing an automatic loading platform adapted for translational movement and for loading and unloading a vehicle. The platform comprises a frame having an upper surface and first means on the frame movable in reponse to the translational movement. Second means are provided which are movable in response to movement of the first means, the second means adapted to support a load such that relative movement between the platform and load occurs upon movement of the platform.

Briefly, the above and other objects, features and advantages of the present invention are attained in a second aspect thereof by providing a method of unloading a load from a platform comprising a frame. The method includes imparting translational movement to the platform in a predetermined direction. The load is maintained in a predetermined position while such movement is imparted by moving a first means in response to the movement and by moving a second, load supporting means in response to said first means. In this manner, the load can be unloaded from the frame by the relative motion between the frame and the load.

BRIEF DESCRIPTION OF THE DRAWINGS

The above and other objects, features and advantages of the present invention will be fully apparent to those of ordinary skill in the art to which this invention pertains from the following description, when considered in connection with the accompanying drawings, in which like reference characters designate like or corresponding parts throughout the several views, and wherein:

FIG. 1 is a perspective view of the automatic loading platform formed in accordance with the present invention;

FIG. 2 is a cross-sectional view taken along line 2—2 of FIG. 1 showing the relationship of the drive and carrier rollers located within the platform;

FIG. 3 is a cross-sectional view taken along line 3—3 of FIG. 2 of a carrier roller;

FIG. 4 is a schematic side plan view of platform and moving apparatus formed in accordance with the present invention;

FIG. 5 is a top schematic plan view of the platform and apparatus illustrated in FIG. 4;

FIG. 6 is a perspective view of the automatic loading platform in relation to a large truck or other vehicle;

FIG. 7 is a cross-sectional view taken along line 7—7 of FIG. 1 illustrating the rollers and air supply apparatus of the platform; and FIG. 8 is a cross-sectional view taken along line 8—8 of FIG. 1 illustrating the end structure and air path of the frame of the automatic loading platform.

DESCRIPTION OF PREFERRED EMBODIMENTS

The present invention will now be described in greater detail with specific reference to the embodiments which are illustrated in the drawings.

More specifically, FIG. 1 illustrates an automatic truck loading platform 10 formed in accordance with the present invention. The platform comprises a frame 11 having a generally rectangular main portion and an inclined ramp portion 12 located at one end thereof. The platform includes a plurality of drive rollers 13 which extend above the top surface 18 of frame 11. These drive rollers are preferably arranged in two substantially aligned rows along the main portion of the frame. A plurality of air exit ports 14, which can be used to provide an air bearing surface for a load, are located along top surface 18, both between the rows of drive rollers as well as between each of these rows and first frame side wall 15 and second frame side wall 16, respectively. The frame is also provided with a rear wall 17 opposite said ramp and a reinforcing frame bottom portion 19. An interlocking joint 20 is provided to rigidly connect the lower edges of the top surface 18 and bottom portion 19.

FIG. 2 illustrates the position, arrangement and movement of the drive rollers 13, which extend beyond the top surface 18 of the platform frame 11, as well as carrier rollers 31, all of which are positioned beneath the drive rollers. The peripheries of the drive rollers engage the peripheries of the carrier rollers at contact points 24 and 25 on the drive rollers, respectively. The carrier rollers rotate about carrier roller axles 23 and the drive rollers about drive roller axles 22. The platform is supported by cylindrical wheels 21, which have a larger diameter than carrier rollers 31. The lowest points of the wheels are generally in abutment with floor 100. The direction of rotation of the carrier rollers during vehicle unloading is indicated by the arrow 176, and the direction of rotational movement of the drive rollers taken at the same time is indicated by the arrows 175. The direction indicated by arrows 177 and 178, respectively, represent the direction in which the platform is being moved during vehicle loading and unloading. Translational movement of platform 10 during unloading, taken along arrow 177, causes wheels 21 and rollers 31 to rotate in a predetermined direction as shown. Rollers 31, in turn, rotatably drive rollers 13, as indicated by arrow 175, in an opposite direction.

FIG. 3 illustrates in great detail the configuration of a carrier roller 31. Each carrier roller includes an inner cylindrical surface, having a first internal diameter measured about its inner surface 33 and a slightly larger inner diameter measured about drive roller bearing bore 34. A bearing is placed within the bore and rests against a bearing seat or counterbore 35. Each carrier roller is driven by drive shaft 41 which has a central passageway or bore for receiving an air flow 43. A plurality of air passages 44 are radially extended from the central bore of the drive shaft. A diaphragm air gap chamber 45 is provided at the end of each radially extending passage and permits air to enter. When air enters chambers 45, it causes elastic diaphragms 51 to expand so that their outer surfaces 50 will engage the inner surface 33 of the carrier roller. Rubber diaphragm 51 is fit within outer seal 61 and inner seal 71. The inner and outer seals are in the form of sleeves and have outer peripheries 60 and 70, respectively. Faces 62 and 72 of the outer and inner seals, respectively, engage the outer face 53 of the elastic diaphragms. Flange 63 of outer seal 61 engages an edge of the inner bearing face 82. Drive shaft 41 has abutments which engage the inner shoulder seal 46 and outer shoulder seal 47, as shown in FIG. 3. Each diaphragm has an inner surface 52, which together with the periphery of the drive shaft, defines the boundaries of air gap chambers 45. The narrow ends of drive shaft 41, located beyond the roller ends, are each engaged at abutment 48 by a rotatable wheel 21.

Until and unless the diaphragms have been expanded by the passage of air through radially extending passages 44, the shaft is substantially freely rotatable within roller 31, i.e., wheels 21 rotate independently of rollers 31. This is achieved by means of a ball bearing arrangement comprising an inner bearing face 82 non-rotatably connected to shaft 41 and an outer bearing face 81 non-rotatably connected to roller 31, together with ball bearings 80 and 83 and connector elements 84. As illustrated, connector elements 84 are snap washers maintaining the bearing arrangement on the shaft.

Air passes through inlet port 49, the central bore of shaft 41 and passages 44, such that the diaphragms are expanded to engage the inner surface 33 of the carrier roller. Due to this frictional engagement, movement of wheels 21 will rotatably turn carrier rollers 31 in the same direction, as best illustrated in FIGS. 2 and 3. Until such engagement is created by the air pressure, the shaft will rotate with wheels 21 but will not turn the carrier rollers.

FIG. 4 is an illustration of the drive apparatus used to move loading platform 10 along a floor 100 and onto a large truck or other vehicle. The apparatus includes a drive motor 110 having gear box 111. The frame can be moved into a vehicle by back pull idler sprocket 93 and front idler sprocket 94, which are driven by drive sprocket 95. Front chain sprocket 91 and back chain sprocket 92 are also provided, as illustrated in FIG. 5. A pull chain 90 is used to impart translational movement to frame 10 and properly position the frame within a truck or other vehicle. The drive apparatus is then used in reverse to withdraw the frame to unload the vehicle.

FIG. 4 also shows a support frame 112 which is provided for air line reel 99 and air line guide 98. This structure provides an air line 96 under frame 10 which connects to air inlet port 97 to supply air to the frame, as best seen in FIG. 5.

FIG. 6 illustrates the automatic truck loading platform of the present invention used in conjunction with truck 140. Platform 10 includes a plurality of palletized loads 150 comprising individual cases 151 and supported by a pallet slip sheet 130. Trailer 140 includes a trailer bed 141 onto which platform 10 is positioned.

FIG. 7 illustrates the relation between the rollers and the travel path of air fed to the platform by air line 96. Bearing 26 is provided for supporting carrier roller axle 23. A spacer 27 is provided for maintaining the bearing 26 in spaced relation from the underside of frame bottom 19. Interlocking joint 20 connects the lower edges of bottom frame portion 19 and top frame portion 18. Air passages 28 extend longitudinally of the frame for conducting air upwardly through air ports 14 in frame portion 18 to provide a fluid bearing cushion for pallets which are placed upon the frame. Each of the air passages is substantially triangular; one includes an air hole 29 which is connected to tubing 30. Tube 30 is in turn connected, via swivel fitting 32, to air inlet port 49 of carrier roller 31. This permits air to enter shaft 41 and the diaphragms to engage inner roller surface 33.

Air line 96 is rotatably wound about and carried by air line carrier spool 85, which is maintained in position by support bracket 86 carrying a pin or spool shaft 87. The support bracket is maintained on the floor 100 by bolt 101 and nut attachment 102. This maintains the air line and support spool in secure and stable relation to the ground. Air line 96 supplies air to air inlet port 97 of the frame.

FIG. 8 illustrates the connection of air lines 96 to air passages 28 for the purpose of providing air to ports 14 as well as to carrier rollers 31. Air passes through line 96 into connector 76, having midpoint line 77, and into a header or manifold 75. The manifold is attached to the connector by means of a bracket or washer 79. Bracket 79 is welded at 120 to the bottom wall 78 of manifold 75, and welding 121 connects the two free ends of the manifold. A second interlocking joint 123 joins the bottom portion of frame back wall 17 to the bottom of manifold 75. Welding 122 joins an upper portion of the manifold to frame bottom 19. The air passes from the manifold into air passages 28, where it is conducted as discussed hereinabove.

The length and width of the apparatus varies in accordance with the size and type of pallet loads and carrier which are to be used. The depth of the loading platform, however, will remain substantially the same for all units, as will the drive and carrier rollers. This depth is generally between about five and six inches. The carrier rollers are sufficiently narrow to permit conventional four wheel forklift trucks to move freely back and forth upon the platform to properly prestage the pallet loads.

The operation for loading and unloading pallets using the platform of the present invention is quite simple. After the platform has been preloaded with pallets, the loading platform is pulled along the floor on which it rests and into the carrier by the gearbox, motor and roller chain combination which is specifically disclosed and shown in FIGS. 4 and 5. Air line 96, connected to entry port 97 on the frame, is unrolled and extended with the platform. The air is then energized so that an air cushion is created atop the frame and the carrier rollers will be engaged by the expanding diaphragms and will thereby be rotatably interconnected with wheels 21. The rubber diaphragms, which are sealed between two aluminum seals or sleeves pressed onto the drive shaft, are secured to the shaft and cause the carrier rollers to be rotated by rotation of the wheels, wheel rotation occurring when the platform is moved outwardly from the vehicle by the pull chain and motor.

As the platform is pulled outwardly from the vehicle, wheels 21 move as translational motion is imparted to platform 10 by means of pull chain 90. The translational motion of the frame causes wheels 21 to rotate, and since the wheels 21 are engaged with carrier rollers 31 via the expanded diaphragms, they cause the carrier rollers to rotate in the same direction. Movement of the carrier rollers, in turn, causes drive rollers 13 with whih they are engaged, as best illustrated in FIG. 2, to rotate in a direction opposite to the direction of rotation of the carrier rollers. The rotation of the drive rollers while the platform is undergoing translational motion causes the pallets on top of the platform to remain stationary as the platform is withdrawn from the vehicle. In this fashion, automatic unloading of the vehicle is achieved as the platform is withdrawn. The air exiting from ports 14 creates a cushion to assist in maintaining the pallets in a stable position.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An automatic loading platform adapted for translational movement and for loading and unloading a vehicle, said platform comprising:
   (a) a frame having an upper surface;
   (b) first means on said frame movable in response to translational movement of said platform, said first means comprising at least one carrier roller and at least one rotatable wheel, each carrier roller comprising a drive shaft having a central air passageway and radially extending air passages connecting said central passageway to at least one air chamber defined by an expansible diaphragm and the periphery of said drive shaft; and
   (c) second means movable in response to movement of said first means, said second means adapted to support a load such that relative movement between said platform and said load occurs upon movement of said platform.

2. An automatic loading platform adapted for translational movement and for loading and unloading a vehicle, said platform comprising:
   (a) a frame having an upper surface;
   (b) first means on said frame movable in response to translational movement of said platform;
   (c) second means movable in response to movement of said first means, said second means extending above said upper surface and being adapted to support a load such that relative movement between said platform and said load occurs upon movement of said platform; and
   (d) means forming an air bearing surface for said load.

3. An automatic loading platform in accordance with claim 2, said frame comprising a reinforcing bottom portion, a rear wall, two side walls and an inclined ramp portion at one end.

4. An automatic loading platform in accordance with claim 3, said frame further comprising a plurality of air ports in said upper surface and a plurality of air passages extending longitudinally beneath said ports, said air ports comprising said means for forming said air bearing surface.

5. An automatic loading platform in accordance with claim 4, further comprising means for supplying air to said frame, said air supply means comprising an air line rotatably supported by a carrier spool, an air manifold on said frame, and means for connecting said air line to said manifold.

6. An automatic loading platform in accordance with claim 5 wherein a tube extends from an air hole provided on one of said passages, said tube being connected to an air inlet port of said first means.

7. An automatic loading platform in accordance with claim 2 further comprising a drive motor and a pull chain for imparting translational motion to said frame.

8. An automatic loading platform in accordance with claim 2 wherein said first means comprises at least one carrier roller and at least one rotatable wheel.

9. An automatic loading platform in accordance with claim 8 wherein said second means comprises at least one drive roller.

10. An automatic loading platform in accordance with claim 9 wherein said at least one drive roller.

11. An automatic loading platform in accordance with claim 10 wherein said second means comprises two aligned rows of drive rollers.

12. An automatic loading platform in accordance with claim 8 wherein said carrier roller comprises a drive shaft having a central air passageway and radially extending air passages connecting said central passageway to at least one air chamber defined by an expansible diaphragm and the periphery of said drive shaft.

13. An automatic loading platform in accordance with either of claims 12 or 1 wherein said roller and said wheel are positioned on said drive shaft such that when said diaphragm is in expanded condition it engages said carrier roller and rotation of said wheel in a predetermined direction rotates said roller in the same direction.

14. An automatic loading platform in accordance with claim 13 wherein said second means comprises at least one drive roller engaging said carrier roller such that rotation of said carrier roller in said predetermined direction rotates said drive roller in an opposite direction.

15. An automatic loading platform in accordance with either of claims 12 or 1 wherein said carrier roller further comprises an inner and an outer sleeve engaging each of said diaphragms and maintaining each of said diaphragms upon said drive shaft.

16. A method of unloading a load from a platform comprising a frame having an upper surface, first means on said frame movable in response to translational movement of said platform, and second means on said frame movable in response to movement of said first means, said second means extending above the upper surface of said frame and being adapted to support a load, said method comprising:

(a) imparting translational movement to said platform in a predetermined direction;

(b) supporting said load with an air bearing surface; and (c) maintaining said load in a predetermined position while said movement is being imparted by moving a first means in response to said movement and by moving said second, load supporting means in response to said first means, so that said load can be unloaded from said frame by the relative motion between said frame and said load.

17. A method of unloading a load from a platform in accordance with claim 16, wherein said first means comprises carrier rollers and said second means comprises drive rollers, said method comprising rotating said carrier rollers in one direction such that said drive rollers are rotated in an opposite direction.

18. A method of unloading a load from a platform in accordance with claim 17 further comprising supplying air to said frame.

19. A method of unloading a load from a platform in accordance with claim 16 wherein said translational movement is imparted to said frame by a motor driven pulling chain.

* * * * *